W. L. SCHELLENBACH AND D. LACY.
METHOD OF AND MECHANISM FOR PRODUCING AUGER BITS.
APPLICATION FILED JUNE 5, 1920.
1,411,191. Patented Mar. 28, 1922.
16 SHEETS—SHEET 8.
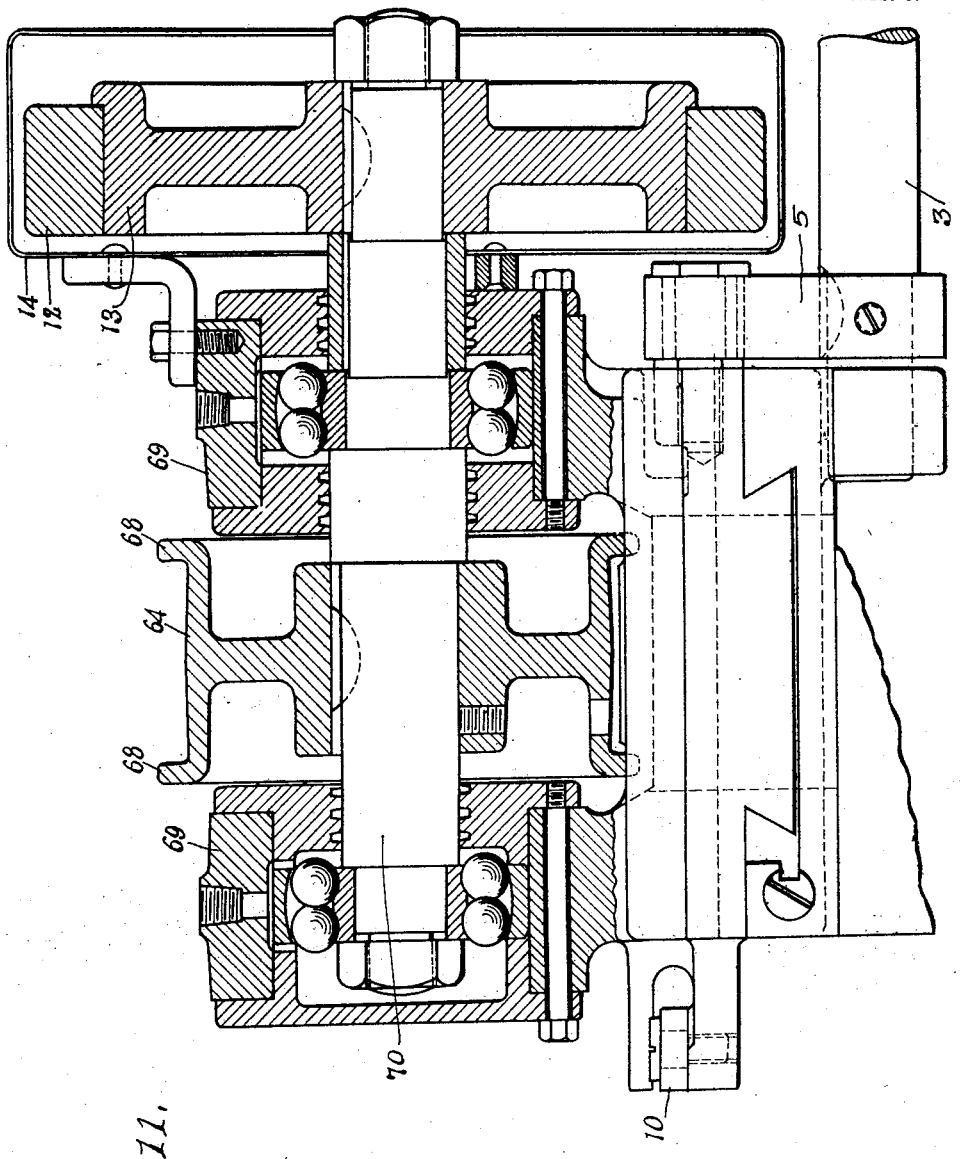
INVENTORS
William L. Schellenbach,
Dell Lacy,
Toulmin & Toulmin
ATTORNEYS.

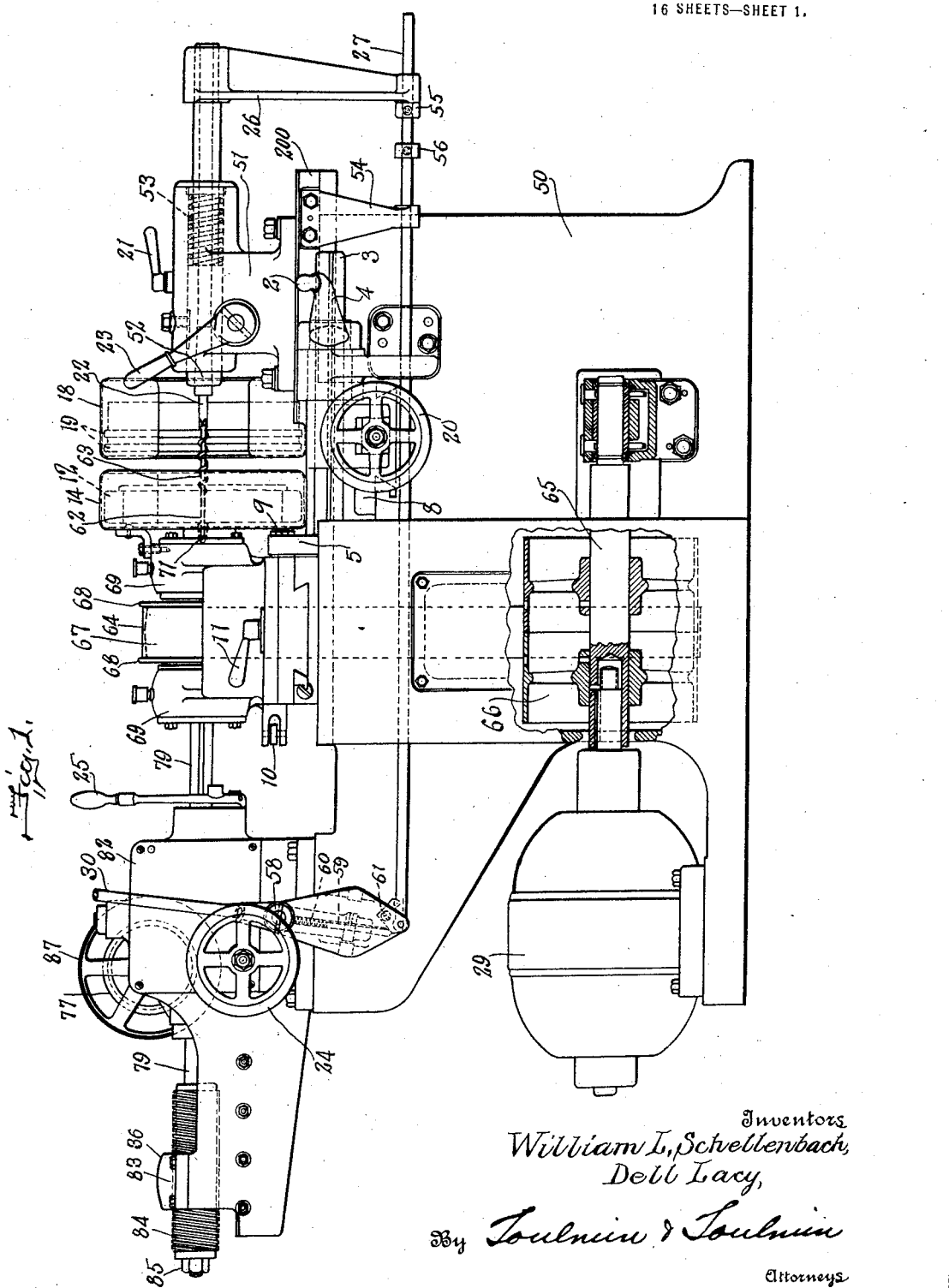

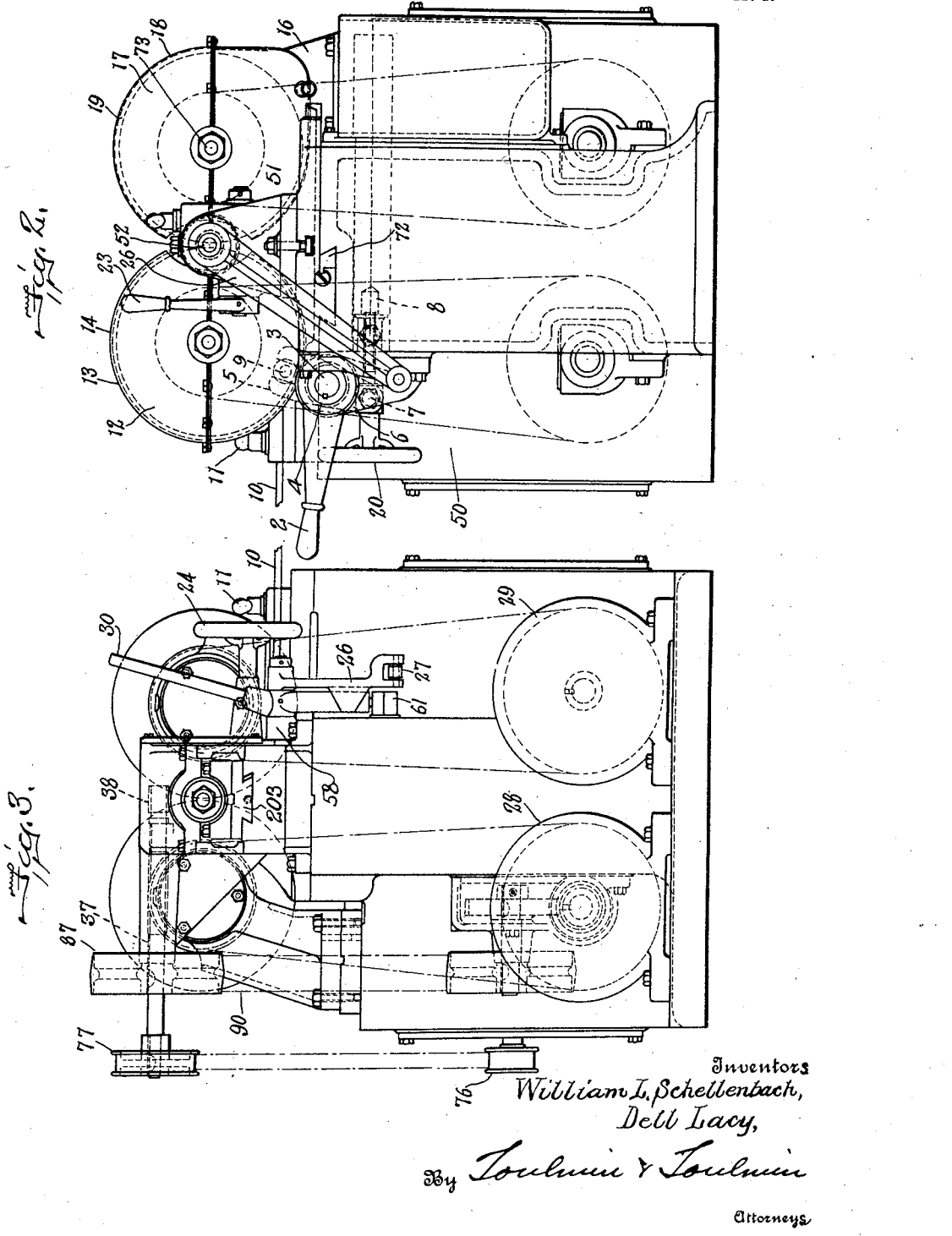

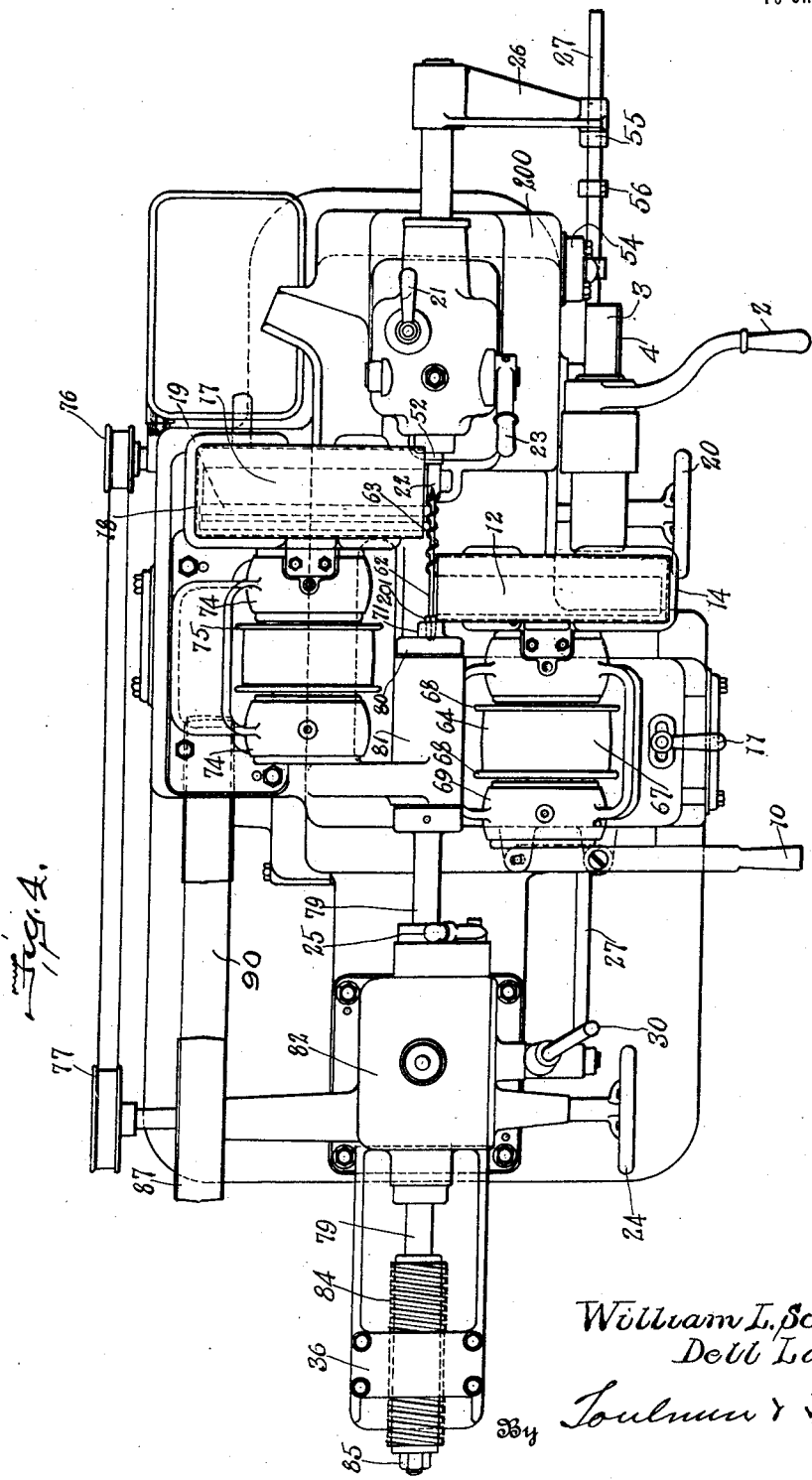

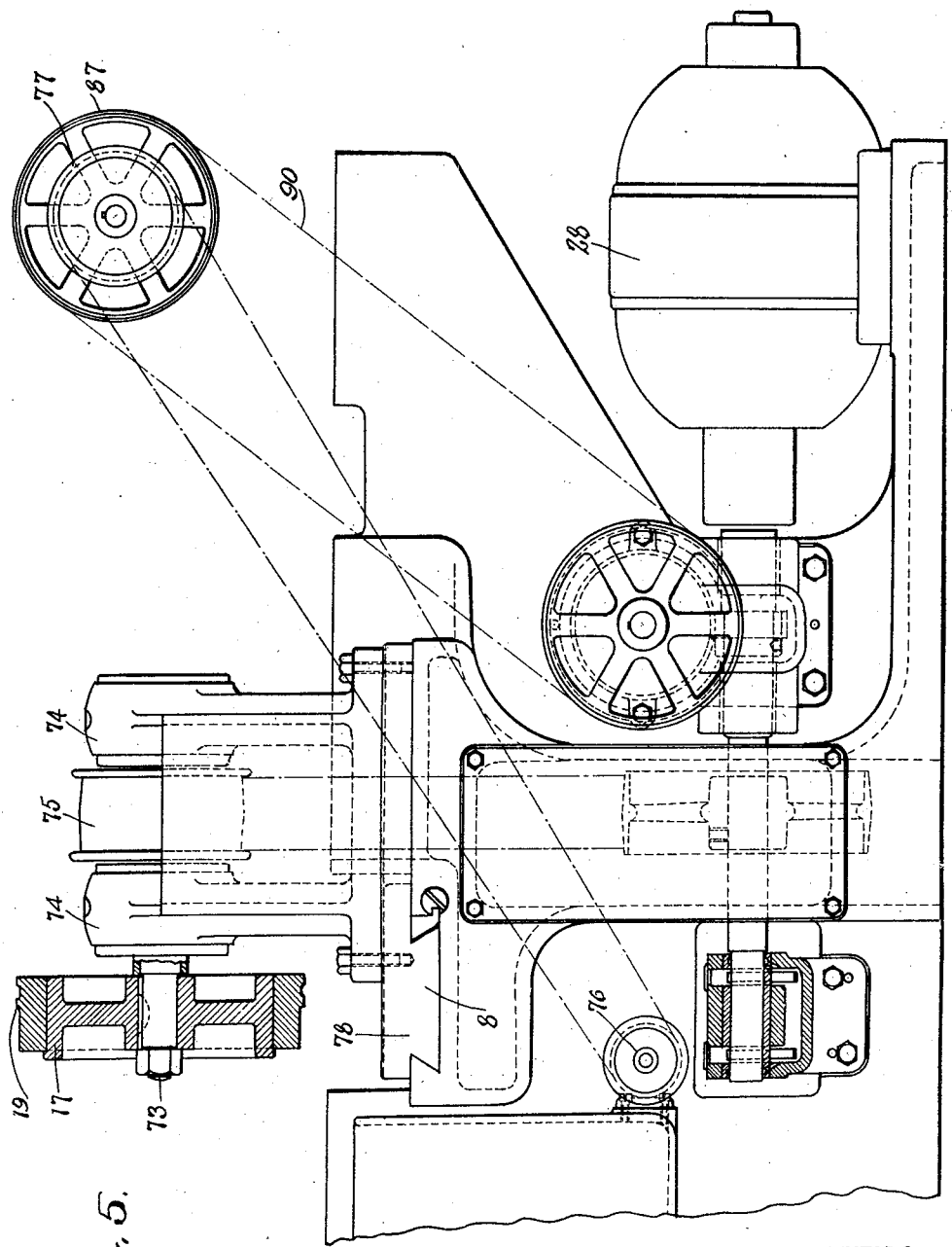

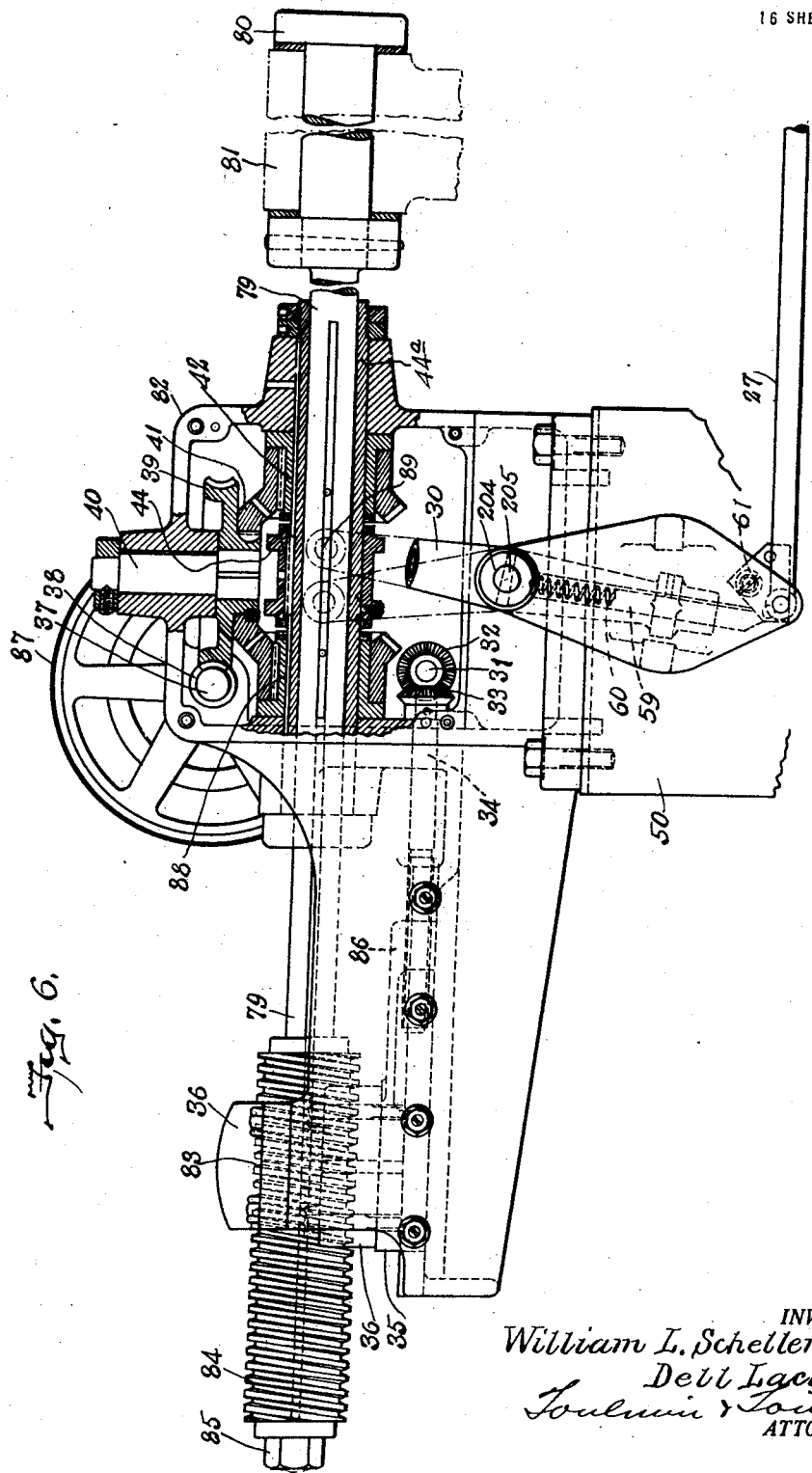

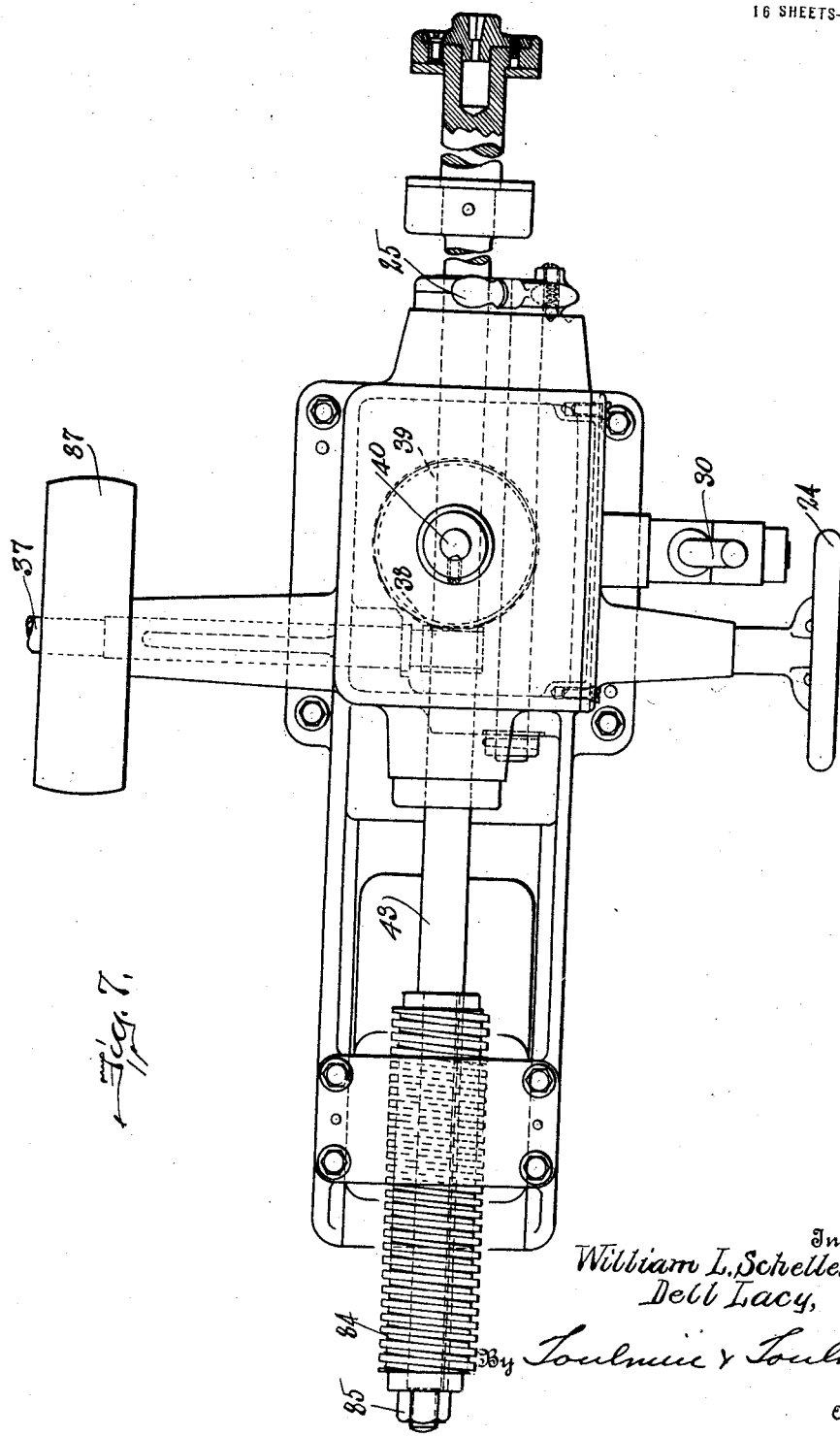

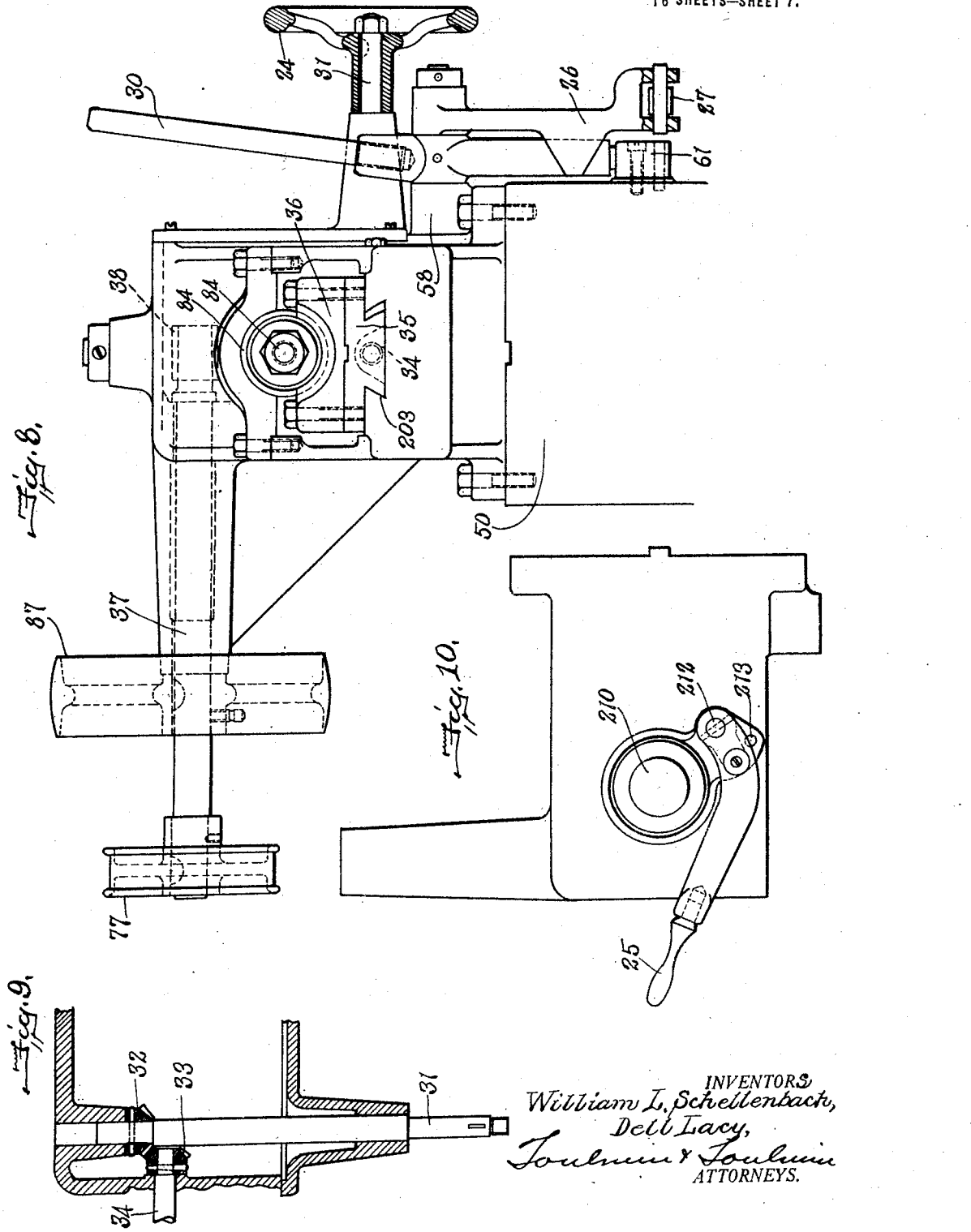

W. L. SCHELLENBACH AND D. LACY.
METHOD OF AND MECHANISM FOR PRODUCING AUGER BITS.
APPLICATION FILED JUNE 5, 1920.
1,411,191.
Patented Mar. 28, 1922.
16 SHEETS—SHEET 9.
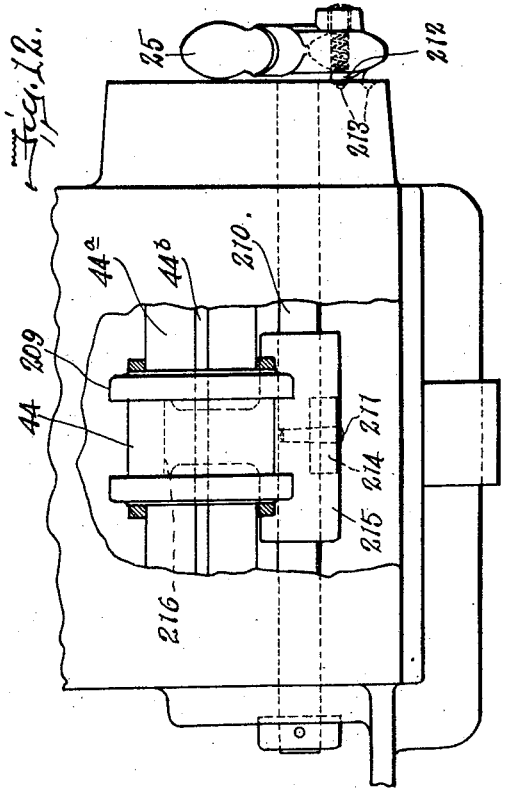
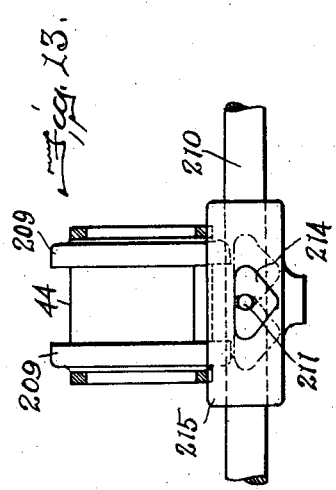
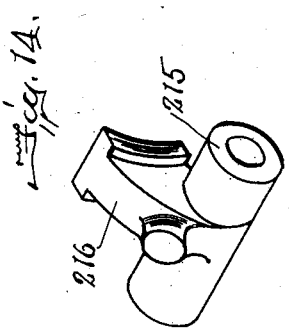
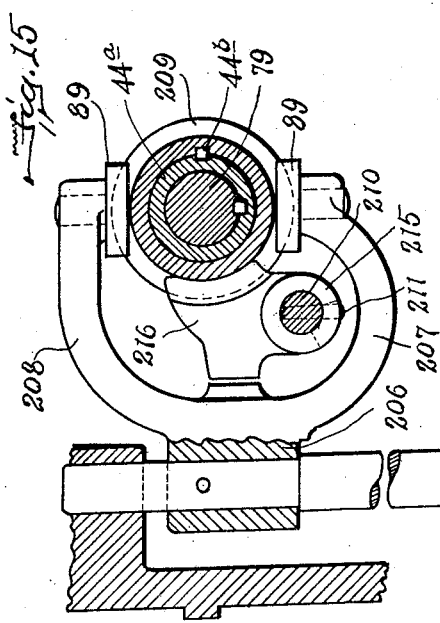
INVENTORS
William L. Schellenbach,
Dell Lacy,
Toulmin & Toulmin
ATTORNEYS.

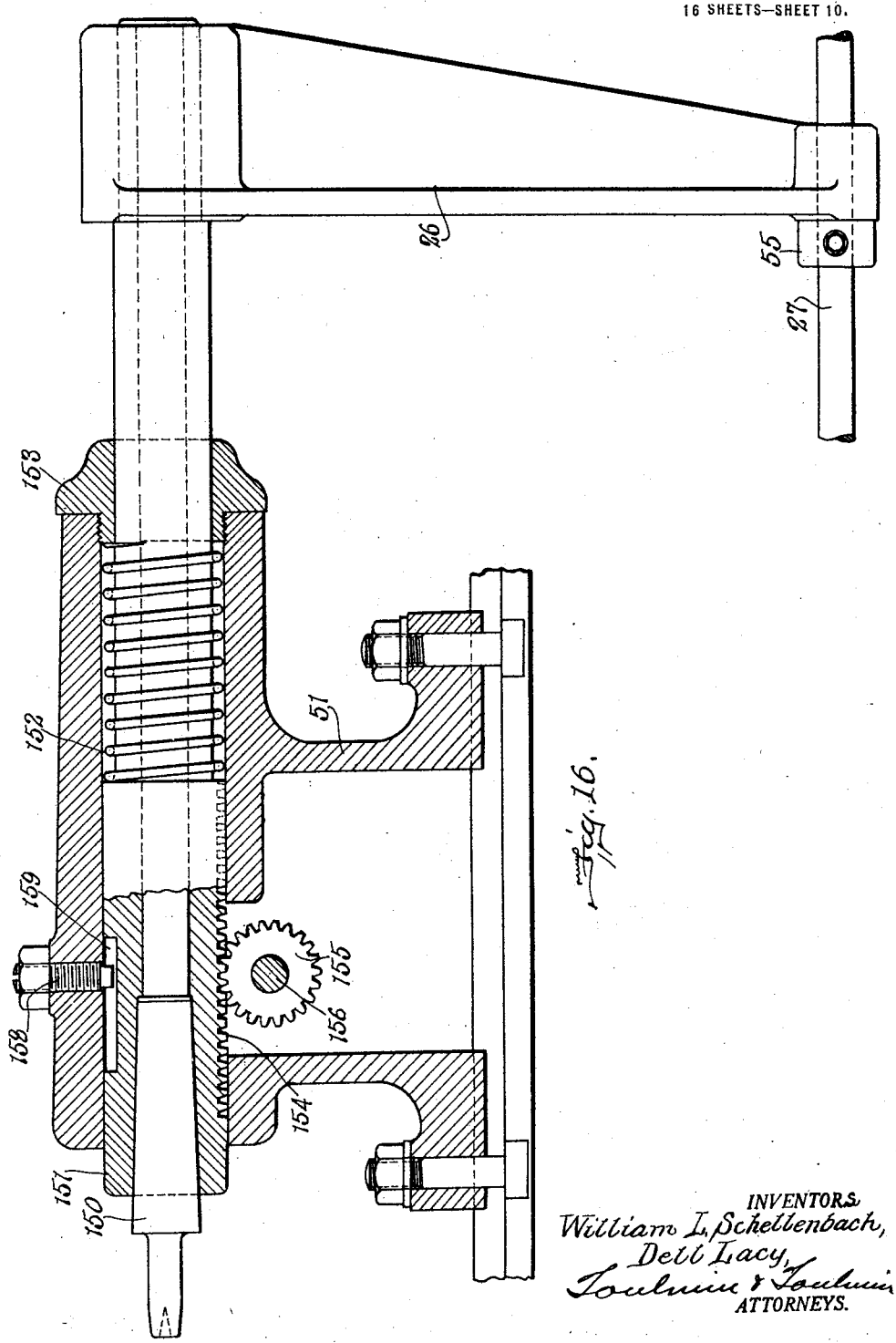

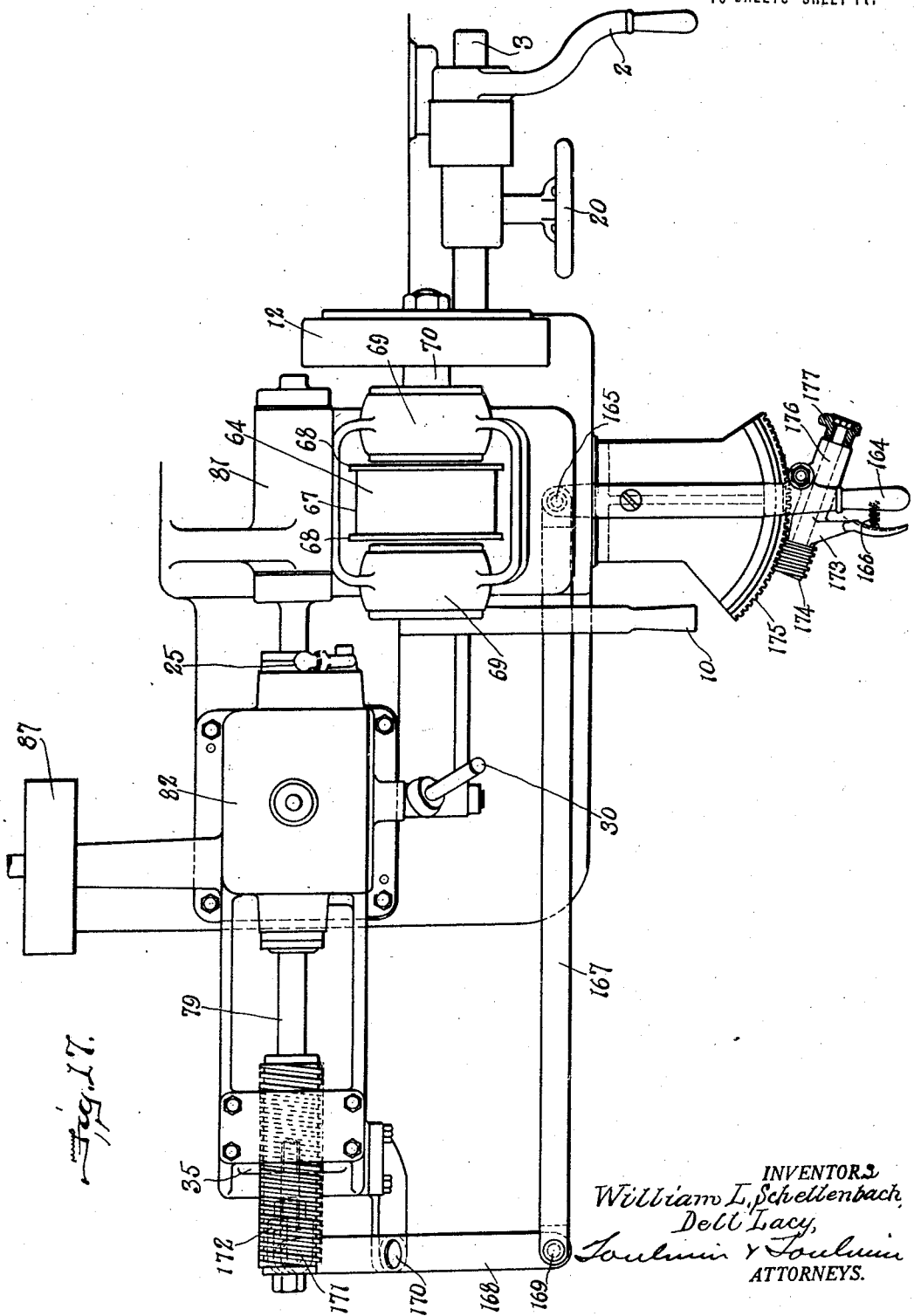

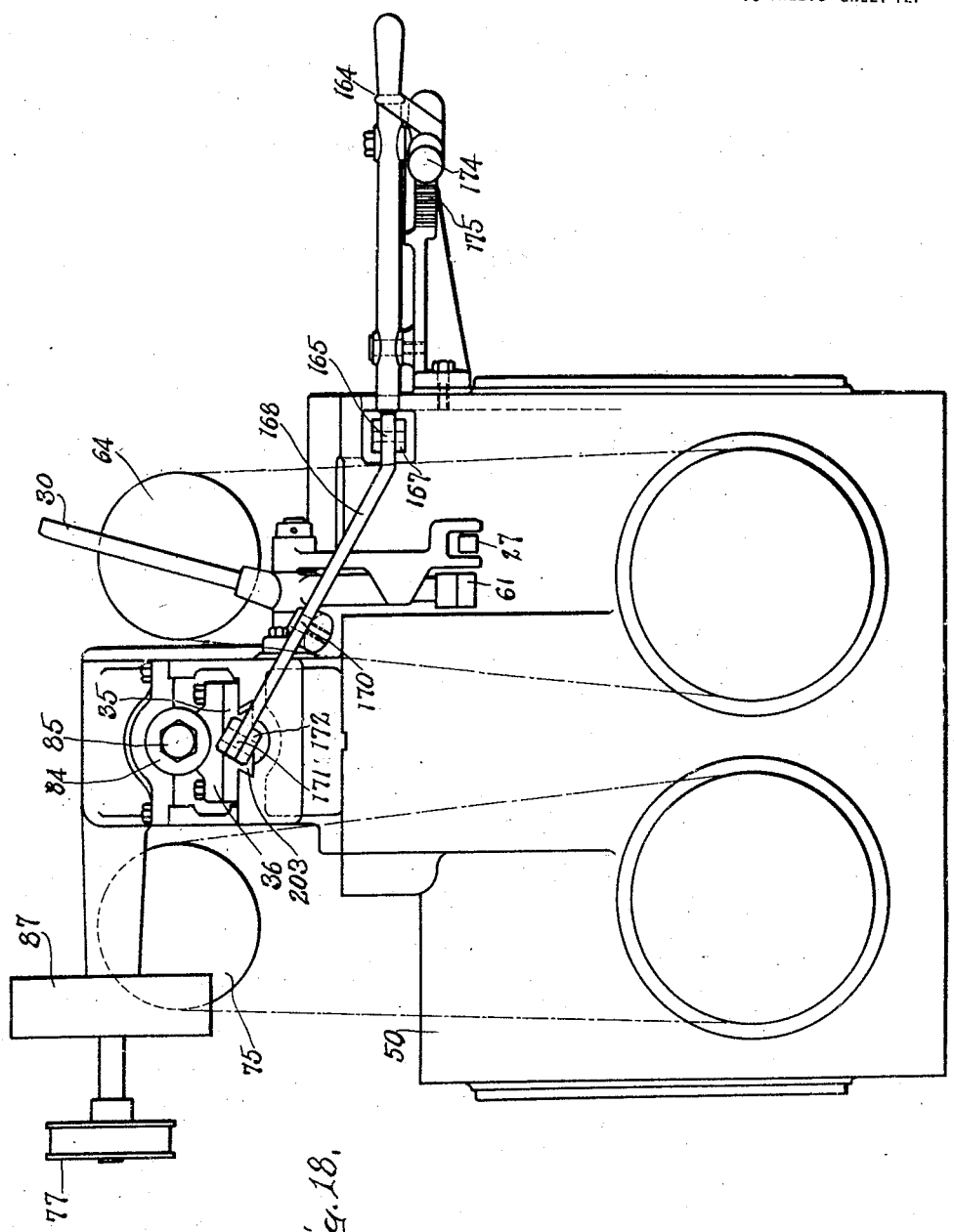

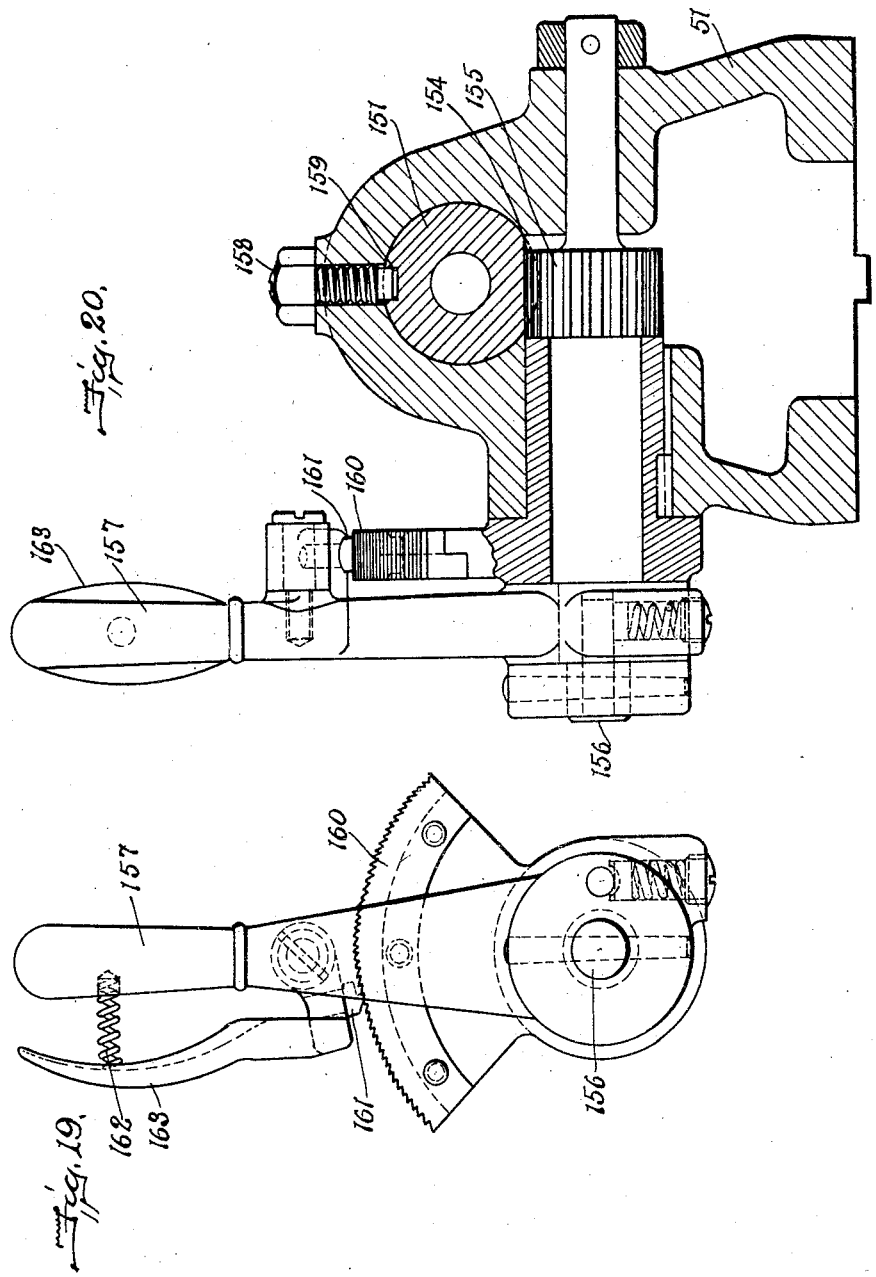

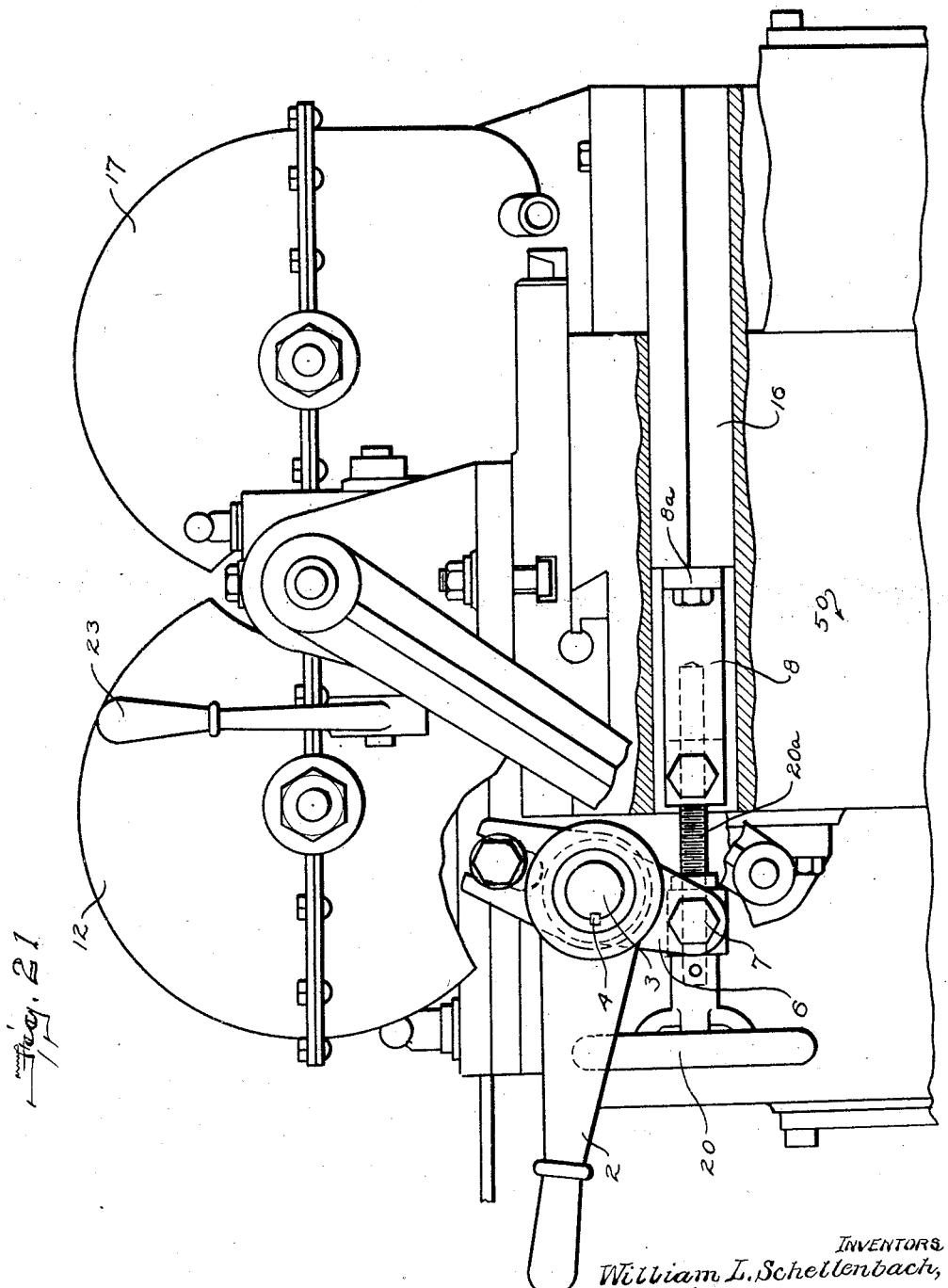

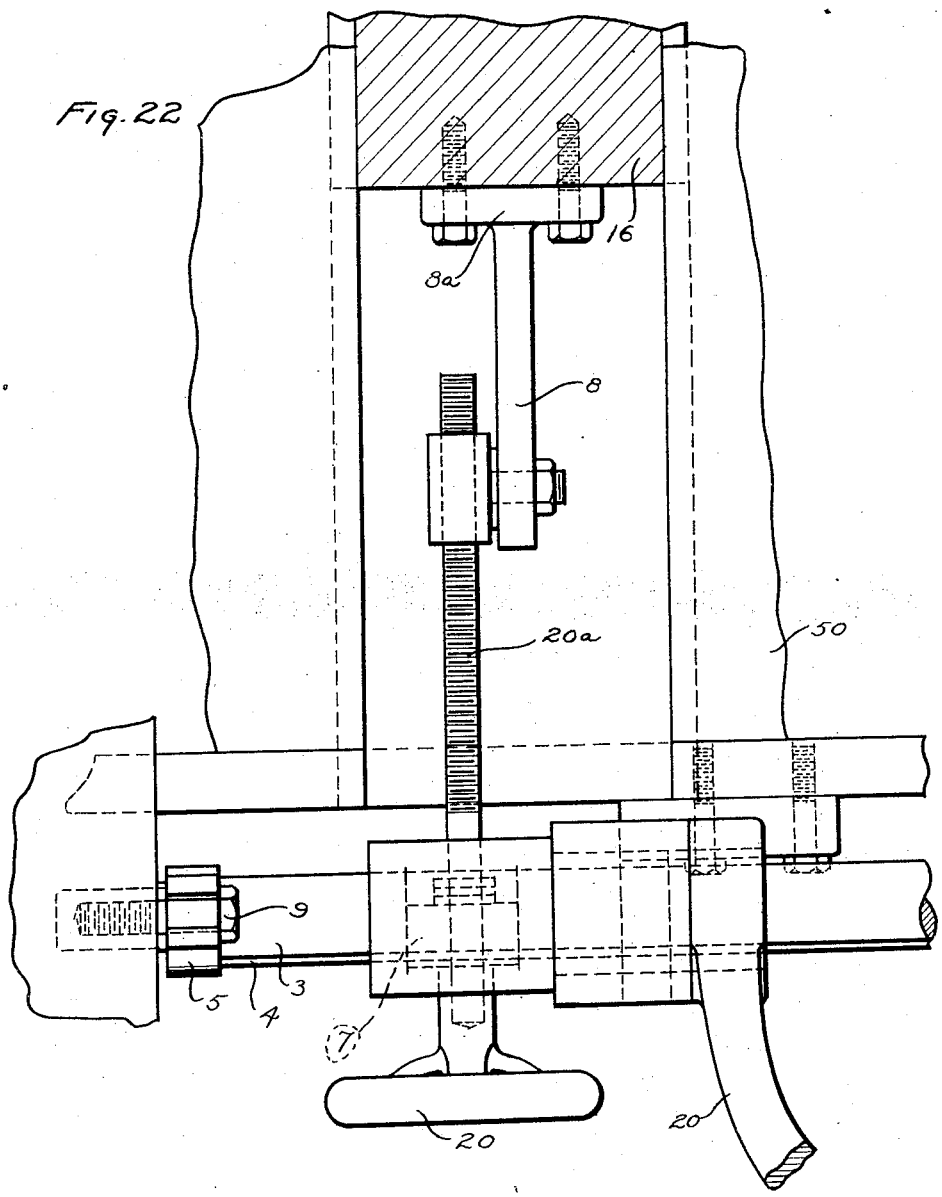

UNITED STATES PATENT OFFICE.

WILLIAM L. SCHELLENBACH, OF CINCINNATI, AND DELL LACY, OF WILMINGTON, OHIO, ASSIGNORS TO THE IRWIN AUGER BIT COMPANY, OF WILMINGTON, OHIO, A CORPORATION OF OHIO.

METHOD OF AND MECHANISM FOR PRODUCING AUGER BITS.

1,411,191.  Specification of Letters Patent.  Patented Mar. 28, 1922.

Application filed June 5, 1920. Serial No. 386,700.

*To all whom it may concern:*

Be it known that we, WILLIAM L. SCHELLENBACH and DELL LACY, citizens of the United States, residing, respectively, at Cincinnati, county of Hamilton, and State of Ohio, and Wilmington, in the county of Clinton and State of Ohio, have invented certain new and useful Improvements in Methods of and Mechanism for Producing Auger Bits, of which the following is a specification, reference being had therein to the accompanying drawing.

Our invention relates to the method of and mechanism for producing auger bits. In particular it refers to the production of auger bits by the removal from the bar of stock of the desired amount of material through the agency of a metal cutting wheel more particularly described and claimed in the co-pending application of Lacy, Serial No. 370,404, filed Apr. 1, 1920.

When a relatively fast moving hard surface which is highly polished moves against a somewhat softer and more or less roughened surface the fast moving surface will tend to drag the grain of the roughened surface and cut it away in minute chips or slivers of metal, the action being somewhat similar to that of a knife cutting a pencil. A grinding operation on the contrary, differs from the foregoing, in that the member being ground is usually about as hard if not harder than a grinding member when the hardness of the article as units as distinguished from the hardness of the particles composing it is considered.

In a grinding operation the individual grains of the grinding compound may be much harder than the individual portions of the article being ground, but the grinding compound being of lesser strength than a group of such hard particles, wears away more quickly than the article being ground. In grinding it becomes a question of mutual abrasion with the surfaces of the articles abrading one another being broken up in fine particles and pulverized, thus resulting in the polishing of one of them and the gradual disintegration of the other.

It is an object of our invention to produce auger bits from a bar of stock.

Heretofore it has been the practice to form the bit through one or more impressions upon the bar of stock to give it the proper configurations for the shank, head and twist, as well as the stem. After the die work upon the bar of stock had been completed, it had been the custom in this art to dress roughly the formed stock, finish the stock and then polish the completed article to give it its final finish.

This practice necessitated a number of operations.

By means of our present invention we are enabled to eliminate all of these steps if desired and in particular to elimnate the extensive die operations and the rough dressing of the auger bit after it had been treated in the bar of stock by the dies. It is within the scope of our invention to complete the bit down to the final polishing by our apparatus and method of treatment, but usually we prefer to confine our operations to the removal of the surplus metal and the rough dressing of the bit.

Another of our objects is to provide a machine which will very rapidly and economically produce auger bits in large quantities with the minimum amount of attention on the part of the operator and with the necessary accuracy. We also desire to secure a cutting medium which will not have to be continually re-shaped and re-dressed or re-tempered, which will have a very long life and will not need the manifold attentions and safeguards incident to the use of the present dressing mediums, such as abrasive wheel.

It is an object of our invention to provide a machine which will automatically reverse itself, which is adjustable to different lengths of a bar of stock, which is adjustable to different pitches of the twist of the bit, and which is adjustable to the different conditions of hardness of the bar of stock, as well as adjustable to the degrees of finish desired upon the completed article.

Referring to the figures of the drawings, they are as follows:—

Fig. 1, is a side elevation of the completed machine taken from the side on which the operator stands;

Fig. 2, is an end elevation of the machine looking from the right hand side to the left hand side of Fig. 1, standing at the right hand side of the view in Fig. 1;

Fig. 3, is an end elevation at the left hand end of the view of Fig. 1;

Fig. 4, is a plan view looking down on top of the machine;

Fig. 5, is a partial rear elevation;

Fig. 6, is a detail of the reversing mechanism and the feeding screw;

Fig. 7, is a plan view of Fig. 6, looking down upon the machine;

Fig. 8, is an end elevation in detail of Figure 6, as that portion of the machine which would be seen when looking at the left hand end of Fig. 1;

Fig. 9, is a detail of the adjusting mechanism;

Fig. 10, is a detail showing the carriage feed lever;

Fig. 11, is a side elevation of the shank wheel and the shank drive partially in section;

Fig. 12, is a detail of the start and stop mechanism; it is a plan view;

Fig. 13, is a detail of the start and stop mechanism and a side elevation thereof;

Fig. 14, is a perspective of the collar and shoulder composing a part of the start and stop mechanism;

Fig. 15, is an end view partially in section of the shifting mechanism and a portion of the start and stop mechanism;

Fig. 16, is a detailed modification of the tail stock mechanism;

Fig. 17, is a plan view of a modification of the adjusting mechanism for the position of the bar of stock rotating shaft;

Fig. 18, is an end elevation of the adjusting mechanism shown in plan in Fig. 17;

Fig. 19, is a side elevation of the adjusting handle on the tail stock;

Fig. 20, is an end elevation of Fig. 19, with the tail stock in section.

Fig. 21 is an enlarged end elevation of the upper portion of Fig. 2 with the side wall of the base of the machine cut away to show the operating mechanism for the fine adjustment for the crimp and shank wheels.

Fig. 22 is a plan view of the fine adjustment with the upper portion of the machine cut away in order to reveal this portion of the mechanism;

Referring to the various figures in which similar numerals refer to corresponding parts, the following is a description of the mechanism;

Figure 23:
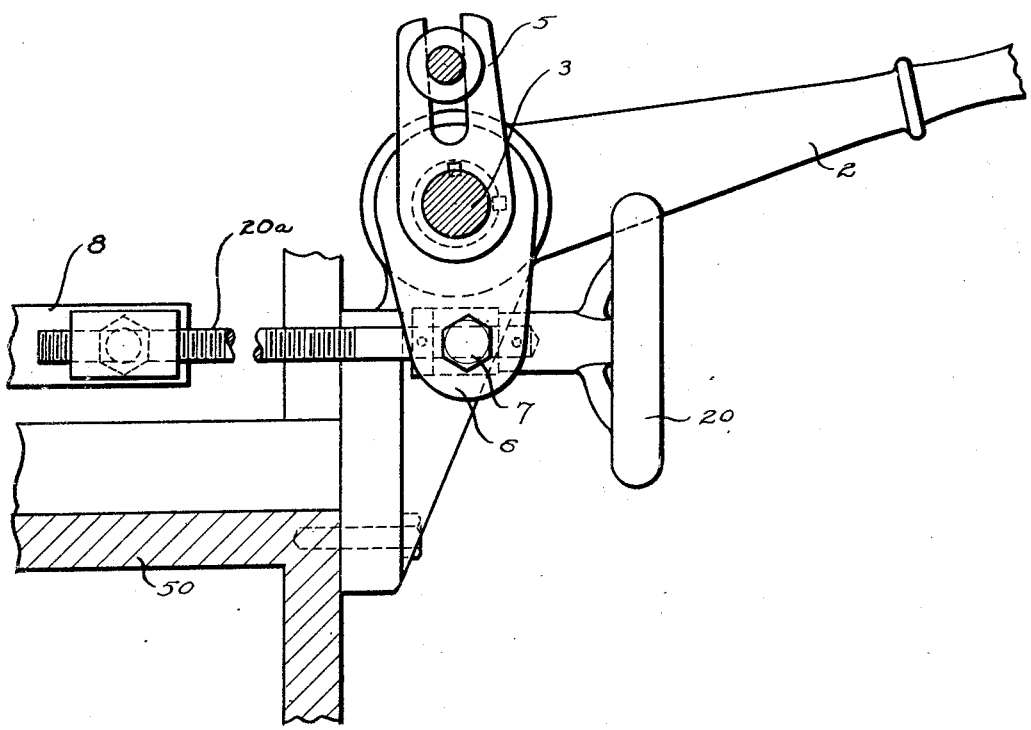
Fig. 23 is a side elevation of the adjusting mechanism for both coarse and fine adjustments through lever 2 and hand wheel 20 looking in a direction opposite to that in Figure 21.

50 is a machine tool base.

Upon this base are mounted two groups of mechanism. One group is stationary during operation, comprising the crimp wheel and the mechanism for its rotation.

The second group is that carrying the head and tail stocks holding the bit stock and also carrying the shank wheel.

On the base 50 is mounted, therefore, the tail stock 51. Carried in this tail stock is the slide member 52, which in turn carries the chuck 22 and, which is spring-pressed by the spring 53 outwardly in a left hand direction, as Figure 1 is viewed. The chuck 22 and the part 52 are moved to the right hand or the left hand by the lever 23. The position of 22 and 52 with respect to 51 is fixed by the clamping lever 21. At the other end of 52 at the right hand side is a depending arm 26 which supports, at its lower end through an eye in the arm, the rod 27. The rod 27 also passes through the bracket 54 likewise attached to the moving carriage 200 of which the support 51 is a part. This rod 27 has on it a setting nut 55 and a setting nut 56. It communicates at its left hand end with the lever 30 pivoted at 58 to the carriage with a spring pressed plunger 59 pressed outwardly by the spring 60. This plunger 59 has a beveled head which alternately engages the inclined surfaces of the cam 61. Through this mechanism, as the cam 61 is fastened to the stationary frame 50, the movement of the carriage is reversed in its direction. In Figure 1, will be seen the motor 29 which drives the shank wheel carried by the carriage as it reciprocates back and forth. The shank wheel is 12 and is used to remove metal from the stem 62 of the bit 63. In order to permit the movement back and forth of the shank wheel and its drive pulley 64, there is placed on the shaft 65 of the motor 29 a broad pulley or drum 66, so that the belt 67 shown in dotted lines on Figure 1, may slip back and forth on this broad surface of the drum 66 while it is prevented from slipping off of 64 by the walls 68 on each side of the pulley 64. The pulley 64 is carried on the shaft 70 supported in bearings 69. (See Fig. 11). The lever 10 seen in Figure 1, and more clearly in Figure 4, is used to adjust the position of the shank wheel 12 laterally with respect to the moving carriage for such minor adjustments as may be necessary to bring the shank wheel opposite the stem 62 as it may vary in length. The position is fixed on the carriage by the setting lever 11.

After the rough stock constituting the material out of which the propective bit 63 is to be made is placed in the jaws of the chuck 22 and 71, it is necessary to bring the crimp and shank cutting wheels in proper engagement with it to form the shank and the twist on the bit.

Referring to Figure 2, will be seen the lever 2, which when lifted will serve to draw the crimp wheel 17 and its housing 18 towards the bit 63 and at the same time draw the shank wheel 12 with its housing 14 towards the shank 62. This dual movement is effected simultaneously by lever 2. The lever 2 is pivoted on the shaft 3 to which is keyed a jaw 5 engaging a pin 9 on the support of the shank wheel 12. This jaw 5 is pivoted at its other end at 7 to a member 6 which is in turn connected to a member 8 running transversely of the machine. 8 is connected at the other end at 8ᵃ to the base 16 which carries the crimp wheel 17. It will be apparent as the lever 2 is lifted the wheels will be brought together and as it is depressed the wheels will be spread apart.

The hand wheel 20 is used to effect a minor adjustment with the member 8 with relation to the jaw 5 through the connection 6, which is pivoted to the jaw 5 at 7 by the movement of the screw 20ᵃ in 8. This is necessary in order to adjust the relative position of the two cutting wheels to one another and to determine the exact time at which the crimp wheel will come in contact with the bar of stock of the bit. The carriage with the tail stock 51 travels on the base 50 in the dove-tail 72 of the usual construction in the machine tool art.

Referring to the crimp wheel, Figure 2, 17 is the wheel itself, 19 the ridges or projections on it to form the proper twists on the bar of stock of the prospective bit and 18 is the safety housing which incases the wheel. Likewise 14 is the housing for the shank wheel 12. The crimp wheel is carried on a shaft 73, Fig. 2, supported in the bearings 74—74, (see Fig. 5) between which is located the driving pulley 75. The crimp wheel with its shaft, bearings and driving mechanism, does not move longitudinally, but only moves laterally outside of its revolutions with its shaft. It is driven by the motor 28 seen in Figure 5. In Figure 5, the crimp wheel with the housing removed can be clearly seen in section at the upper left hand corner. The pump 76 for supplying oil or any cutting compound to the bit being manufactured and its drive 77 from the motor 28 can also be clearly seen in this view. 78 is a dove-tail construction which guides the sliding movement of the crimp wheel transversely of the machine.

Referring to Figures 1 and 4, 79 is a chuck shaft on the right hand end of which is a chuck 71 with an enlarged head 80 which holds the shank ends of the prospective bit. Next to the chuck end of the chuck shaft 79 is a bearing 81 which supports that end of the chuck shaft 79. The chuck shaft 79 passes through the box 82 which contains the reversing gear shown in detail in Figures 6, 7 and 9. The chuck shaft 79 then passes through a support 36 which is internally threaded at 83. Within this internally threaded support is the screw 84 mounted on the end of the chuck shaft 79 and retained by the nut 85 at the end of the chuck shaft 79. The pitch of this worm 84 or screw is that of the twist of the bit to be produced, so that the revolution of the screw, and consequently the chuck shaft 79 will revolve the bar of stock of the bit at the proper speed and in proper time with the crimp wheel, so that the configurations or projections on the crimp wheel will cut away the metal between the twists and in the hollows down to the stem of the finished bit removing at the same time any surplus metal on the periphery of the twist and the periphery of the head.

In order to adjust the position of the shaft 79 with its worm and internally threaded support it is mounted upon a support 36 sliding in a dove-tail 203 and which is actuated by a shaft 34. 34 is threaded into a projection of 35 in the form of a neck at 86. The shaft 34 carries a bevel gear 33 at its right hand end as Figure 6 is viewed, which meshes with a bevel gear at right angles thereto, known as 32, mounted on the end of the shaft 31. At the other end of the shaft 31 is the hand wheel 24 seen at the left hand of Figure 1, all of which mechanism is carried by the moving carriage. 36 is adjusted, with its bed 35 by the wheel 24, in the groove or dove-tail 203 of the housing 82. The object of this adjustment is to bring the chuck shaft 79 carrying the bar of stock in proper position with relation to the crimp and shank wheels before the operation commences.

The drive for the carriage is seen in the plan view of Figure 7. The pulley 87 on the housing 82 which drives the carriage backwards and forwards is mounted on the shaft 37 which has on its inner end a worm 38. This worm meshes with a worm wheel 39 mounted on a vertical stub shaft 40. The worm wheel 39 has fastened to it on its under side a bevel gear 41 which meshes with a bevel gear 42 on one side and with a bevel gear 88 on the other side. Both gears 42 and 88 turn loosely on the chuck shaft 79 while the clutch 44, with a series of teeth on each end, is mounted on the sleeve 44ᵃ (splined to the chuck shaft 79) so that it may be moved laterally on the shaft in either direction as a clutch. The sleeve 44ᵃ is used so as to prevent any communication of movement or pressure on the clutch 44 when sliding on the sleeve 44ᵃ; this pressure would be present in case the clutch 44 were directly splined on the shaft 79. Teeth on either end of 44 are adapted to engage with either 42 or 88 depending upon the direction in which it is desired to turn the shaft. This clutch 44 with the teeth on either end, is actuated in either direction from time to time by the reversing lever 30 which is connected at 89 to 44.

On the end of the shaft 37 outside of the pulley 87 is mounted a pulley 77 connected to the pulley 76. 90 is the belt, (Figures 4 and 5), which drives the pulley 87, supplying power to reciprocate the carriage.

Referring to the right hand side of the machine as viewed in Figure 1, the length of movement of the carriage is determined by the stops 56 and 55. When 26 comes in contact with 55 it moves the shaft 27 which is connected to the reversing mechanism until the stop 56 comes in contact with the bracket 54 which is stationary, at which time the reversing lever 30 is actuated and the carriage starts in the opposite direction.

When the carriage 200 moves to the left 26 comes in contact with 55 and moves the shaft 27, which is connected to the reversing mechanism until the feed is reversed and the movement of the slide 200 starts to the right.

The bracket 54 is fastened to 200 and engages the stop 56, thus tripping the feed and again reversing the movement.

The object of this adjustment is to have the carriage travel a distance necessary to give a complete treatment to the entire twist of the bar of stock by the crimp wheel. If it happens that the bar or stock is longer than normal, it will be seen that when the adjustment is made in fitting the bar of stock in the jaws of the chuck 22 it will be moved further over to the right which will carry with it the shaft 52 and the bracket 26 so that the bracket 26 will stand away from 55 just so much as the bar of stock is longer than normal. Consequently, the bar of stock will have a correspondingly longer treatment by the crimp wheel as the member 26 will have to travel an equivalent distance greater than usual before it comes in contact with stop 55, moves the reversing shaft, brings 56 in contact with 54 and throws the reversing mechanism to reverse the direction of the carriage.

In this connection, it should be understood that one revolution of the screw 84 is equal to one space on the bit between the shoulders of the twist.

Referring to Figures 6, 8, 10, 13, 14 and 15, the following is a description of the method of stopping and starting the movement of the carriage as it is actuated by the chuck shaft 79. In Figure 6, it will be seen that the clutch 44 is splined to the sleeve 44$^a$ which sleeve is splined to shaft 79. 44 assumes three positions: engagement with the gear 88, neutral, and engagement with gear 42. Gears 88 and 42 turn loosely on the sleeve 44$^a$.

The shifting of the clutch 44 with its teeth on either end into engagement with 42 is accomplished by the movement of the reversing lever 30 which (see Fig. 1) is connected to a shaft 204 at 205. This shaft carries on it a member 206 having a pair of jaws 207 and 208. These jaws have heads 89 which project between the walls 209 of the clutch 44.

In Figures 15, 12 and 13 will be seen a jack shaft 210. On this shaft is mounted a pin 211. The shaft itself is actuated by the lever 25 which may be set by the spring pressed plunger 212, to two positions up or down as determined by the notches 213. By actuating 25 (see Fig. 10) and thereby rotating the jack shaft 210 we move the pin 211. The pin 211 travels in a triangular slot or opening 214. This opening is in the collar 215. The movement of the pin 211 downward and in contact with walls of the opening 214 will move the collar 215 to its neutral position. Connected to 215 is a projecting shoulder 216 which projects between the walls 209 of the clutch 44 and as 215 is moved laterally, 216 moves the clutch 44 laterally on the chuck shaft 79. Therefore, it is possible to adjust the clutch 44 only in neutral position by the handle 25 and thus stop the revolution of the chuck shaft 79. In one position of the jack shaft 210 and its pin 211 it will have no effect upon 44 being shifted back and forth by the lever 30, but when actuated it may withdraw 44 to a neutral position, thus stopping all rotation of the chuck shaft 79.

Referring to Figure 1, again, we have described one of our embodiments of our invention in that portion of the machine which holds the head of the bit. In Figure 16, is another construction. 150 is the centering device carrying the tail stock 51. This centering device is tapered and fits into a cylindrical holding member 151. This cylindrical holding device is spring pressed in the left hand direction by the spring 152, which abuts against the stock 153. The member 151 is actuated in either direction by the rack 154 and the pinion 155, the latter carried on the shaft 156, which is rotated by the lever 157, seen in Figures 19 and 20. The limit of movement of 151 is determined by the pin 158 traveling in the slot 159 which has been cut away in one side of 151. The precise position of 151 is located at any point by the rack 160 and the dog 161 carried by the lever 157. The dog is held in engagement by means of the spring 162 and moved out of engagement by the lever 163. The advantage of this particular construction is to adjust the centering piece with one hand.

In Figures 17 and 18, is an alternative construction for the adjusting of the position of the chuck shaft 79.

The coarse adjustment of the position of the chuck shaft 79 is effected by the lever 164. This lever is pivoted at 165 to another lever 167. 167 is pivoted to 168 at 169. 168 is supported pivotally at 170 and is connected pivotally at 171 to the yoke 172, which is fastened to 35. This adjusts 35 and 36 carrying the chuck shaft 79, lengthwise of the machine. The fine adjustment is secured when the spring 166 on the lever 164 is allowed to bring the member 173 to a position where the worm 174 carried by it will mesh with the rack 175. This worm 174 turns freely with respect to 173 and is actuated by a shaft 176 revolved by a nut 177 so that a careful, fine adjustment can be made of the precise position of the chuck shaft 79.

*Method of Operation.*—The bar of stock 63 has its shank placed in the chuck 71 of the head stock and by actuating 23 the head of the bar of stock is placed in the tail stock 51 being properly centered by the centering chuck 22. The proper engagement of 22 with 63 is determined by the movement of 23. The position is fixed by the locking lever 21. By actuating lever 2, the crimp wheel and shank wheel may be brought into engagement with the bar of stock 63. The precise relationship between the two wheels and the bar of stock is determined by the adjusting wheel 20.

25 is then actuated to bring 44 into engagement with either 88 or 42.

If it is desired to adjust the position of the shank wheel with respect to the portion 62 of the bit 63, then it is unlocked by the lever 11 from its fixed position and adjusted by the lever 10. Upon the adjustment being completed, it is again locked by 11. The hand wheel 24 or the lever 164 can be used to adjust the precise position of the chuck shaft 79 and its worm 84.

In operation, the crimp wheel is stationary while the bar of stock rotates and reciprocates, being carried by the chuck shaft 79 which rotates it and reciprocates it. The rotation and reciprocation is determined by the screw 84 and the direction of movement is effected through the clutch 44 and its co-operating mechanism.

The shank wheel travels with the bar of stock and acts upon it as it rotates.

The tail stock 51, the operating mechanism for the shank wheel and the shank wheel, as well as the chuck shaft 79 revolving the bar of stock, will reciprocate on the bed 50. The handle 2 for actuating the crimp wheel and the shank wheel to and from the bar of stock is pivoted on the shaft 3 and splined to it. It is provided, however, that it may move on the shaft 3 longitudinally as the shaft is supported by and journaled on the base 50. The spline on the shaft 3 is marked 4. The lever 2 slides up and down this shaft 3.

Having thus fully described our invention, what we claim as new and desire to secure by Letters Patent, is:—

1. In a machine for forming bits, means to form the twist, means to form the shank, means to rotate a bar of stock, and means to reciprocate the bar of stock, and means to reverse the rotation and reciprocation of the bar of stock.

2. In a machine for forming bits, means to form the twist, means to form the shank, means to rotate a bar of stock, means to reciprocate the bar of stock, means to reverse the rotation and reciprocation of the bar of stock, and means to adjust the twist forming means and means to adjust the shank forming means in their engagement with said bar of stock.

3. In a machine for forming bits, means to form the twist, means to form the shank, means to rotate a bar of stock, means to reciprocate the bar of stock, means to reverse the rotation and reciprocation of the bar of stock, means to adjust the twist forming means and means to adjust the shank forming means in their engagement with said bar of stock, and means to move said twist and shank forming means into and out of engagement with said bar of stock.

4. In a machine for forming bits, means to form the shank, means to form the twist, means to rotate a bar of stock, means to reciprocate the bar of stock, a head stock and a tail stock carrying the bar of stock between the shank forming means and the twist forming means, and means adjustable on said tail stock to accommodate varied lengths of bar of stock.

5. In a machine for forming bits, means to form a shank, means to form a twist, means to rotate a bar of stock, means to reciprocate a bar of stock, and means to adjust said shank forming means relative to said bar of stock.

6. In a machine for forming bits, means to form the shank of a bit, means to form a twist of a bit, means to rotate a bar of stock, means to reciprocate the bar of stock, and means to start and stop said rotation and reciprocation.

7. In a machine for forming bits, means for forming the shank of a bit, means to form the twist of the bit, means to rotate a bar of stock between said forming means, means to reciprocate the bar of stock, a head stock and a tail stock and means to adjust said head stock and tail stock to the lengths of the bar of stock.

8. In a machine for forming bits, means for forming the shank of a bit, means to form the twist of the bit, means to rotate a bar of stock between said forming means, means to reciprocate the bar of stock, a head stock and a tail stock, means to adjust said head stock and tail stock to the lengths of the bar of stock, and means to adjust said shank forming means to said bar of stock.

9. In a machine for forming bits, means to form the shank of a bit, means to form the twist of the bit, means to rotate a bar of stock, means to reciprocate a bar of stock, and means to move sad bar of stock rotating means, reciprocating means and shank forming means relative to said twist forming means, 10. In a machine for forming bits, a base, an adjustable tail stock, and a head stock adapted to carry a bar of stock therebetween; a shaft carried by said head stock, a chuck on one end of said shaft, a screw on the other end of said shaft turning in a portion of said base, a shank wheel connected with the head stock, said head stock, tail stock, shank wheel, and shaft carrying the bar of stock with them sliding on said base; a crimp wheel stationary on said base, and means to rotate said crimp wheel and said shank wheel and means to rotate said shaft and means to reciprocate on said base the tail stock, head stock and shank wheel.

11. In a machine for forming bits, a base, an adjustable tail stock, and a head stock adapted to carry a bar of stock therebetween; a shaft carried by said head stock, a chuck on one end of said shaft, a screw on the other end of said shaft turning in a portion of said base, a shank wheel connected with the head stock; said head stock, tail stock, shank wheel and shaft carrying the bar of stock with them, sliding on said base; a crimp wheel stationary on said base, and means to rotate said crimp wheel and said shank wheel, means to rotate said shaft and means to reciprocate on said base the tail stock, head stock, and shank wheel, and means connected to the tail stock adapted to reverse the direction of rotation of said shaft and the direction of longitudinal movement of said head stock, tail stock, crimp wheel and shaft.

12. In a machine for forming bits, a base, a crimp wheel, stationarily mounted thereon and adapted to rotate, a shank wheel mounted thereon adapted to rotate and reciprocate, a head stock, a chuck carried by said head stock, a chuck shaft revolving said chuck carrying the chuck on one end and the worm on the other, means on said base co-operating with said worm, a tail stock, means on said tail stock to adjust it to the length of a bar of stock placed between it and the head stock and locking means to fix said adjustment, a depending arm from said tail stock, a rod parallel to said base carried loosely by the outer end of said arm, a stop on said rod to limit the movement of said arm, a bracket on said base, a stop on said rod whereby the limit of movement of the rod will be determined by said stop and said bracket, a cam on said base, a reversing arm connected to said rod, a spring-pressed plunger on said reversing arm co-operating with said cam, gears means to rotate said gears, a clutch turning with said shaft, and adapted to slide loosely on said shaft between said gears, and means on said reversing arm to bring said clutch into engagement with either of said gears whereby said chuck shaft may be rotated in a reversed direction upon the limit of movement of said rod.

13. In a machine for forming bits, a crimp wheel, a shank wheel, a head stock, a tail stock between which a bar of stock is held, a centering piece in said tail stock, means to adjust longitudinally said centering piece, means to limit the movement of said centering piece longitudinally, and means to lock it in position after adjustment.

14. In a machine for forming bits, a crimp wheel, a head stock, and a tail stock adapted to carry a bar of stock therebetween to be acted upon by said wheels, a tapered centering piece carried by said tail stock, a spring pressed supporting member carrying said centering piece, traveling in said tail stock, a hand lever for moving said supporting member longitudinally to adjust the position of the centering piece, a hand lever to lock said supporting member in position and a spring carried by said tail stock actuating said supporting member in one direction and means on said tail stock to limit the movement of said supporting member.

15. In a machine for forming bits, a crimp wheel, a head stock, and a tail stock adapted to carry a bar or stock therebetween to be acted upon by said wheels, a centering piece carried by a supporting member traveling in said tail stock, a supporting member, a spring actuating said supporting member in one direction, means on said tail stock limiting the movement of said supporting means, a rack on said supporting means, a pinion on an actuating shaft co-operating with said rack, an actuating shaft, a lever thereon to rotate said shaft, and means on said lever to lock it in any desired position whereby said centering piece may be adjusted to accommodate different lengths of bar of stock.

16. In a machine for forming bits, a crimp wheel, a shank wheel, a head stock, and a tail stock, adapted to carry between them a bar of stock to be acted upon by said wheel, a shaft carried by said head stock adapted to rotate the bar of stock, a screw at one end of said shaft, a nut in which said screw travels, fixed to the frame of the machine, a pair of gears traveling loosely on said shaft, means for driving said gears, an intermediate clutch carried between said gears, a reversing lever connected thereto, said last mentioned gear being adapted to turn with and to slide on said shaft, means connected with said tail stock to shift said reversing lever whereby said last mentioned gear is brought into engagement alternatively with one of the gears turned loosely on said shaft whereby the direction of the shaft is reversed.

17. In a reversing gear for a machine tool, a bed, a driving shaft carried thereon, a chuck at one end of said shaft, and a worm at the other, an internally threaded member on said bed co-operating with said worm, a pair of spur gears loosely turning on said shaft, a third gear on a jack shaft driving said spur gear, means for rotating said third gear, a clutch traveling with said shaft and splined thereon to move longitudinally, having teeth on either end thereof, a yoke engaging the faces of said clutch between said teeth, a shaft on which said yoke is mounted, a reversing lever fixed to said shaft, a spring pressed member connected to said reversing lever, having the outer end thereof adapted to co-operate with a reversing cam on said bed, a reversing cam, a rod connected to said reversing lever, a tail stock, and means on said tail stock for limiting the movement of said rod whereby the clutch is alternatively engaged with either of said loosely turning gears and the direction of the motion of the shaft is alternatively reversed.

18. In a reversing gear for a machine tool, a bed, a driving shaft carried thereon, a chuck at one end of said shaft, and a worm at the other, an internally threaded member on said bed co-operating with said worm, a pair of spur gears loosely turning on said shaft, a third gear on a jack shaft driving said spur gears, means for rotating said third gear, a clutch traveling with said shaft and splined thereon to move longitudinally, having teeth on either end thereof, a yoke engaging the faces of said clutch between said teeth, a shaft on which said yoke is mounted, a reversing lever fixed to said shaft, a spring pressed member connected to said reversing lever, having the outer end thereof adapted to co-operate with a reversing cam on said bed, a reversing cam, a rod connected to said reversing lever, a tail stock, means on said tail stock for limiting the movement of said rod whereby the clutch is alternatively engaged with either of said loosely turning gears and the direction of the motion of the shaft is alternatively reversed, and means for adjusting the position of said internally threaded member whereby said shaft is adjusted longitudinally on the bed.

19. In a machine tool, a drive shaft, a pair of loosely turning gears thereon, spaced apart, means for simultaneously rotating said gears, a clutch located between said gears on said shaft with teeth on either end thereof and adapted to turn with said shaft and slide longitudinally thereon, a shoulder on either end of said clutch, a jack shaft parallel to said main shaft, means on said jack shaft to rotate it, a pin on said shaft, a loosely sliding collar on said jack shaft, having a projecting shoulder extending between the shoulders on said clutch on the main shaft, a triangular aperture in said collar on the jack shaft in which said pin travels, whereby when said jack shaft actuating means is operated, the clutch on the main shaft may be brought to the desired position.

20. In a machine tool, a drive shaft, a pair of loosely turning gears thereon, spaced apart, means for simultaneously rotating said gears, a clutch located between said gears on said shaft with teeth on either end thereof and adapted to turn with said shaft and slide longitudinally thereon, a shoulder on either end of said clutch, a jack shaft parallel to said main shaft, means on said jack shaft to rotate it, a pin on said shaft, a loosely sliding collar on said jack shaft, having a projecting shoulder extending between the shoulders on said clutch on the main shaft, a triangular aperture in said collar on the jack shaft in which said pin travels, a yoke, having its free end engaging said clutch on the main shaft, means to actuate said yoke to move said clutch longitudinally on said main shaft, a reversing lever connected to said shifting means, and means to shift said reversing lever at predetermined intervals.

21. In a machine tool, a bed, a main shaft mounted thereon, means of rotating said shaft, one end of said shaft being carried in a head stock and the other end of said shaft having a worm thereon carried by an internally threaded member mounted on said bed, an internally threaded member, a dove-tail extension on said member, co-operating with a groove in said bed, a projecting arm from said member, a shaft connected to said arm turning therein, a gear on the end of said shaft, a second shaft with a gear thereon co-operating with the first mentioned gear and a hand wheel to rotate said second shaft whereby the longitudinal adjustment of said main shaft on the bed may be secured by the rotation of said hand wheel.

22. In a machine tool, a main shaft, having a chuck on one end thereof and a worm on the other end, a bed, means on said bed sliding thereon adapted to receive said worm, a link having one and connected to said means and the other end connected to a second link, said first mentioned link being centrally pivoted on said bed, a second link connected to a lever, a lever, a worm mounted on said lever, a rack mounted on said bed, and means on said lever for bringing said worm and said rack into and out of engagement with one another, means on said lever for rotating said worm in engagement with said rack, whereby said main shaft may have a course and fine adjustment of its lateral position on said bed.

23. In a machine for forming bits, a bed, a crimp wheel, a shank wheel, a head stock, a tail stock, a shaft to support said shank wheel, a pulley on said shaft with shoulders thereon, a broad pulley for driving said shaft, a belt connecting said pulleys, said second pulley being adapted for said belt to slide thereon, a dove-tail support for said shaft, means for moving said dove-tail support, and the shank wheel laterally, a second dove-tail support beneath the first mentioned support at right angles thereto and means for moving said shaft and a shank wheel transversely.

24. In a machine for forming bits, a bed, a crimp wheel, a shank wheel, a head stock, a tail stock, a shaft to support said shank wheel, a pulley on said shaft with shoulders thereon, a broad pulley for driving said shaft, a belt connecting said pulleys, said second pulley being adapted for said belt to slide thereon, a dove-tail support for said shaft, means for moving said dove-tail support, and the shank wheel laterally, a second dove-tail support beneath the first mentioned support at right angles thereto and means for moving said shaft and a shank wheel transversely, locking means for said lateral movement and locking means for said transverse movement.

25. In a machine for forming bits, a bed, a head stock, a tail stock, a drive shaft, means for rotating said drive shaft, means for reversing and reciprocating said drive shaft, a shank wheel, a crimp wheel, said crimp wheel having a support traveling in a groove transversely of said bed, a support for said crank wheel having a groove traveling transversely of said bed, a shaft, means to rotate said shaft, means on said shaft pivotally connected to said shank wheel supporting means at one end and pivotally connected to said crimp wheel supporting means at the other end whereby upon rotating said shaft, said shank wheel and said crimp wheel, may be caused to travel to and from each other on said bed.

26. In a machine for forming bits, a bed, a head stock, a tail stock, a drive shaft, means for rotating said drive shaft, means for reversing and reciprocating said drive shaft, a shank wheel, a crimp wheel, said crimp wheel having a support traveling in a groove transversely of said bed, a support for said shank wheel having a groove traveling transversely of said bed, a shaft, means to rotate said shaft, an arm on said shaft pivotally connected to said shank wheel supporting means at one end and pivotally connected to said crimp wheel supporting means at the other end, whereby upon rotating said shaft, said shank wheel and said crimp wheel may travel to and from each other on said bed, and means to adjust the distance between said crimp wheel and said shank wheel.

27. In a machine for forming bits, a bed, a head stock, a tail stock, a drive shaft, means for rotating said drive shaft, means for reversing and reciprocating said drive shaft, a shank wheel, a crimp wheel, said crimp wheel having a support traveling in a groove longitudinally on said bed, a support for said shank wheel having a groove traveling longitudinally on said bed, a shaft, means to rotate said shaft, an arm on said shaft pivotally connected to said shank wheel, supporting means at one end and pivotally connected to said crimp wheel supporting means at the other end, said actuating shaft being adapted to move laterally on the bed with said shank wheel while said crimp wheel remains stationary thereon with no lateral movement and means sliding on said shaft to adjust the position relative to one another of said crimp wheel and said shank wheel.

In testimony whereof, we affix our signatures.

WILLIAM L. SCHELLENBACH.
DELL LACY.